April 19, 1966   F. ECKHARDT ETAL   3,247,254
PROCESS FOR PRODUCING FORMALDEHYDE
FROM A LOWER SATURATED HYDROCARBON
Filed Jan. 27, 1961
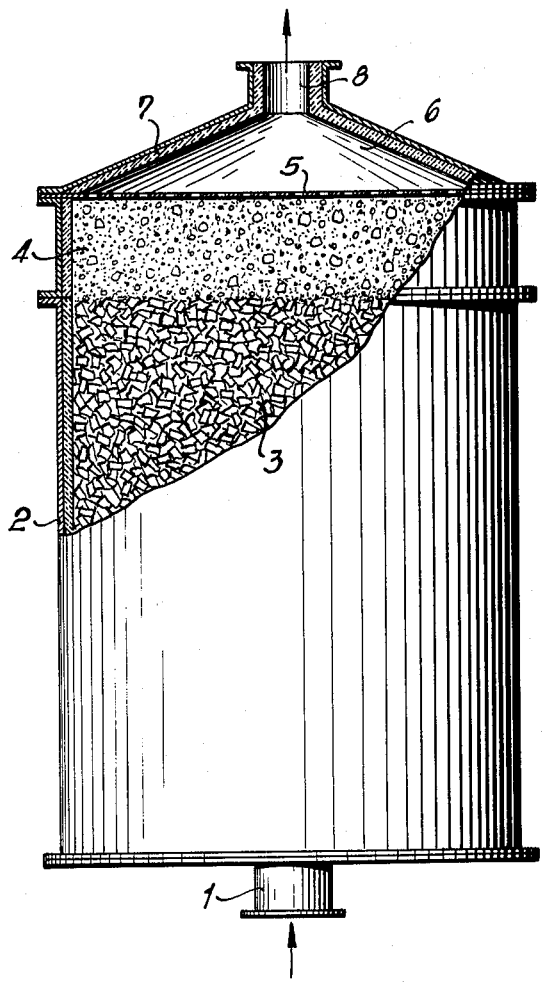
INVENTORS:
FRIEDRICH ECKHARDT, EWALD HAUSMANN, HANS-OLAF HEINZE
BY
Burgess, Dinklage + Sprung
ATTORNEYS United States Patent Office 3,247,254
Patented Apr. 19, 1966

3,247,254
PROCESS FOR PRODUCING FORMALDEHYDE FROM A LOWER SATURATED HYDROCARBON
Friedrich Eckhardt and Ewald Hausmann, Oberhausen-Sterkrade, and Hans-Olaf Heinze, Oberhausen-Rhineland, Germany, assignors to Huttenwerk Oberhausen Aktiengesellschaft, Oberhausen-Rhineland, Germany, a German corporation
Filed Jan. 27, 1961, Ser. No. 85,291
Claims priority, application Germany, Feb. 9, 1960, H 38,611
10 Claims. (Cl. 260—604)

This invention relates to an improved process and an improved apparatus for the oxidation of methane or its homologs with air or a gas containing or comprising free oxygen to produce formaldehyde. In particular, it relates to the oxidation of methane or its homologs with air or gas containing or comprising free oxygen to produce formaldehyde with apparatus and by a process in which the methane or its homolog, together with air or gas containing or comprising free oxygen, is passed as a stream through a confined porous bed of small size solids which are catalyst to the reaction, and thereafter through a metal netting adjacent said porous bed.

It has been proposed heretofore to prepare formaldehyde by oxidation of methane by passing the stream of reaction materials in gas phase upwardly through a confined bed of solids which are finely divided and which are catalyst to the reaction at a velocity at least sufficient to maintan the solids in a fluidized state. As the reaction is strongly exothermic, the solids must be removed and recirculated continuously both for the purpose of temperature control and revivification of the activity of the solids. Furthermore, the gas cannot be circulated at a lower velocity than the stated minimum required for fluidizing in order to obtain the desired effect in spite of the fact that in certain instances the longer or shorter time or intimacy of contact of reactants with solids is desired and at a lower or higher temperature. This procedure is most costly.

It has also been proposed to effect the oxidation while passing the gas stream containing the methane and oxidant gas into contact with a fixed bed of catalyst. In the known reactions of this type, the preservation of the formaldehyde in the amount formed is not easy and commonly further reaction occurs with the destruction of the formaldehyde before it can be removed and cooled.

The present invention provides an improved process and apparatus for the oxidation of methane or its homologs to formaldehyde of high operating efficiency, comprising passing methane or its homolog in admixture with air or a gas containing or comprising free oxygen through a fixed porous bed of finely divided catalyst and thereafter through a metal netting adjacent the catalyst bed in the direction of gas flow.

As starting hydrocarbon reactant there may be employed methane or its homologs as, for example, propane and ethane.

As catalyst, there is preferably employed pumice and, most preferably, Italian pumice.

The metal netting is composed of a transition metal or an alloy of transition metals and preferably of an alloy of platinum and iridium. Most advantageously, a metal netting constructed of an alloy consisting of 95% platinum and 5% iridium is used. Metal nettings as, for example, constructed of a copper-tin alloy are also advantageously employed in accordance with the invention.

Nitrogen oxide or ammonia, which is oxidized to nitrogen oxide in the reaction, is added to the gas stream containing the reactants prior to their admission into the reactant.

The gas reactants either separately or in admixture may be preheated prior to being admitted into the reactor. Alternatively, the reactor and/or the metal netting may be heated and possibly a combination of the preheating of the gas reactants and of the apparatus may be advantageously utilized. The stream of reaction products passing out through the metal netting must be quickly quenched or cooled and any conventional procedure therefor may be utilized. A waste heat boiler also may be used to cool and recover sensible heat from the stream of reaction products.

The present invention, when operated with a single pass produces high yields without the necessity of recycling. Moreover, the process and apparatus may be advantageously and conveniently adapted to continuous or semi-continuous operation when sacrificing operating efficiency or high standard of product purity.

Less than one second contact time for the reacting stream with the catalyst is generally required. The exact contact time is, however, dependent upon a number of factors, as, for example, temperatures employed and, in particular, the temperature at the metal netting, air (or other oxidizing gas)-methane ratio, the particular catalyst utilized and particularly the composition of the metal netting.

In the process according to the invention, the reactants in the mixture react as a boundary surface interface The methane or its homolog in admixture with the oxidizing gas first passes through a fixed porous bed of the divided catalyst, the CH— bonds of the reactant hydrocarbon thereby being activated. The fixed catalyst bed may have a temperature below that required for the oxidation reaction to take place. The reactant gas mixture then passes through the metal netting arranged immediately adjacent the porous catalyst bed in the direction of gas flow. The formaldehyde is formed at the boundary surface-interface of the fixed bed catalyst and of the adjacent metal netting, the metal netting supplying the activated oxygen necessary for the reaction.

When the metal netting is constructed of platinum, in order to start up the reaction, the temperature of the metal netting must be about 400° C. An additional heating of the netting thereafter is not required as the reaction temperature adjusts itself when adequate quantities of the reactant gases are fed into the reactor and when a satisfactory formaldehyde output is selected. Thus, it is merely necessary to adjust the relative amounts of air or other oxygen gas and methane used and adjust the temperature at the netting so that the same is not appreciably above or below 400° C. Increasing the amount of oxygen flowing into the reaction chamber, other things remaining the same, raises the temperature and, after the optimum point is passed, causes excess formation of water and oxides of carbon as products of combustion.

In the oxidation of methane or its homologs with air or a gas containing or comprising free oxygen, it is known that the recovery of the formaldehyde in the amount formed is not easy and commonly further reaction occurs with the destruction of the formaldehyde before the same can be removed and cooled. It is an advantage of a process according to the invention that a thermic destruction of the formaldehyde formed is substantially completely avoided due to the fact that the reaction takes place only at a boundary surface-interface. Furthermore, it is possible to keep the increase of temperature caused by the exothermic process substantially completely under control and to maintain the reaction temperature at a constant predetermined level throughout the entire reaction chamber and to form formaldehyde without any outside heat being supplied once the reaction is started.

Thus, a highly efficient and economical operation is brought about.

A further advantage of the invention lies in that by using the platinum nettings, it is possible to produce nitrogen oxide which, as is known in the art, is added to the reactant gas mixture in view of decreasing the ignition temperature thereof, at the netting by burning ammonia.

The figure shows diagrammatically one form of apparatus in which this invention may be practiced.

In the figure, the reactant gases which previously have been admixed by a device not shown in the drawing enter into the reaction vessel 2 through inlet conduit 1. Methane as well as its homologs can be used in the process of the invention. Oxygen or air to which oxygen has been added may be used. The use of atmospheric air, however, is particularly advantageous in that the same results in an effective discharge of surplus reaction heat. Although the reactant gas mixture may be preheated in some cases, it is preferable if the gas mixture is introduced into the reaction vessel without having been preheated and is heated up within the reaction vessel, utilizing surplus reaction heat and in some instances heat produced from the side reactions of the two reactants. In the lower part of the reaction vessel there is arranged an inactive porous bed 3 which, for example, may be made up of Raschig rings. This bed imparts a part of the reaction heat to the gas mixture, entering the reactor as the reactant gaseous material flows therethrough. After inactive bed 3, there is arranged the porous catalyst bed 4, after which is immediately arranged the metal netting 5. In order to facilitate the start-up of the reaction, the catalyst bed and preferably the metal netting may be provided with means for supplying heat thereto. In general, heat is not required once the reaction is started, as the operation is self-sustaining. The volume of the chamber 6, which lies adjacent the metal netting and which is located so that the gases may flow therethrough after passage through the metal netting, is kept quite small in order to prevent the decomposition of the formaldehyde which has been formed; the surfaces of chamber 6 which are exposed to the reaction products are covered by a ceramic inert layer 7. The reaction product leaves the reaction vessel at 8 and is immediately quenched by conventional means which are not shown in the drawing.

The process can be carried out in a single pass or the reaction gas following removal of the formaldehyde formed may be re-cycled. Thus, for example, the stream of reaction products is recovered and after removal of the formaldehyde formed the reaction gas is re-cycled. Variations in the ratios of reactants, in the particular metal or combination of metals used for the netting, in the temperature at the netting and in the gas ratios influence the residence time of the gas mixture at the netting required to obtain a maximum output of formaldehyde.

The following examples are given simply in illustration of this invention and not in limitation thereof:

Example 1

The equipment similar to that shown in the accompanying drawing is here employed in the oxidation of methane to form formaldehyde. The metal netting used in the reactor consists of an alloy of 95% platinum and 5% iridium and has 250 openings per square centimeter, and is constructed of wire having a diameter of 0.12 millimeter. Italian pumice of a grain size ranging from 4 to 6 millimeters and displacing a volume of 15 cubic centimeters is used as catalytic agent in the fixed bed. 36 normal liters per hour of methane, 180 normal liters per hour of air and 0.1 volume percent of nitrogen oxide based on the total volume of the gas mixture) are passed as a gas stream through the reactor. The temperature of the reactant gas mixture on entering the reactor is 20° C. The residence time (based upon the thickness of the netting) is 0.0011 second. The reaction temperature as determined by measuring the temperature at the netting is 675° C. Utilizing only a single pass, an output of 83.9 grams of formaldehyde per normal cubic meter of methane is obtained.

Example 2

25 normal liters per hour of propane, 500 normal liters per hour of air, and 0.1 volume percent of nitrogen oxide (based on the total volume of the reactant gas mixture) are passed through the reactor. The residence time (based upon the thickness of the netting is 0.0005 second. The reaction temperature measured at the netting is 560° C. All other conditions are substantially as described in Example 1. With a single pass 126 grams of formaldehyde per normal cubic meter of propane are obtained.

Example 3

The reactor in this instance is equipped with a metal netting consisting of an alloy of 94% copper and 6% tin. The netting has 576 openings per square centimeter and is constructed of wire having a diameter of 0.17 millimeter. 90 normal liters per hour of propane and 500 normal liters per hour of air and 0.1 volume percent of nitrogen oxide (based upon the total volume of reactant gas mixture) are flowed through the reactor. The residence time is 0.0053 second and the reaction temperature as measured at the netting is 620° C. The reaction conditions are otherwise as described in Example 1. In a single pass, an output of 192 grams of formaldehyde per normal cubic meter of propane is obtained.

In Examples 1–3 the metal nettings are in each instance electrically preheated to a temperature of 400° C. Further heating is not necessary once the reaction has been started, as the reaction is self-sustaining.

The Italian pumice used in the reaction chamber has the following analysis:

| | Percent |
|---|---|
| $SiO_2$ | 69.15 |
| $Al_2O_3$ | 14.50 |
| $Fe_2O_3$ | 1.70 |
| $CaO$ | 0.76 |
| $Na_2O$ | 3.85 |
| $K_2O$ | 5.85 |
| $TiO_2$ | 0.10 |
| $MnO$ | 0.11 |
| Mg | Traces |
| Co | Traces |
| Cr | Traces |
| Ni | Traces |
| Pb | Traces |
| Ag | Traces |
| Ti | Traces |
| Cu | Traces |
| Sn | Traces |
| V | Traces |
| Mo | Traces |
| Glow loss | 3.98 |

As starting hydrocarbon reactant there may be employed any hydrocarbon taken from the group of alkanes, provided, that its boiling point is below the reaction temperature. However, cracking may occur with heavy alkanes, and the hydrocarbons preferably used in the process are ethane, methane, propane, butane, pentane, hexane and heptane. Mixtures, containing at least two of these hydrocarbons may also be employed.

As catalyst, silicates, borates, salts of silver, vanadium pentoxide, compounds of manganese and more broadly compounds of any of the elements found in pumice may be employed. The catalyst may be contained or more preferably deposited on the surface of a carrier substance which has no or little catalytic properties of its own, e.g. a silicate.

Materials preferably used for the metal netting are platinum, iridium, rhodium, silver and copper. Alloys, containing one or more of these metals may also be used, as well as steel nettings having a coating of one of said metals or alloys.

The wire used in making the wire netting may have a diameter between 0.04 and 1.0 mm., however, diameters between 0.08 and 0.2 mm. are preferred. The netting may have from 100 to 1000 openings per square centimeter. The thickness of the metal netting may be between one-and-a-half and five times the wire diameter, preferably two times the wire diameter.

The particle size for the materials used to form the fixed bed catalyst layer may be between 1 and 50 mm., preferably between 5 and 20 mm.

Reaction temperatures between 400 and 700° C. are preferred, however the reaction temperature may be higher, the limit being the softening point of the netting metal employed, if high traveling speeds of the gaseous stream are provided for.

The process preferably is carried out at elevated pressures, most preferably the pressure in the reaction vessel is between 4 and 20 atmospheres.

We claim:

1. A process of manufacturing formaldehyde comprising reacting together a gaseous admixture of a lower saturated hydrocarbon and a member selected from the group consisting of gases containing free oxygen and free oxygen by passing said mixture through a finely divided pumice catalyst, and thereafter through a metal netting composed of a member selected from the group consisting of platinum, iridium, rhodium, silver, copper, and alloys thereof, said reaction being conducted at a temperature of about 400 to 700° C., and recovering the reaction products containing formaldehyde thereby produced.

2. Process according to claim 1, wherein said catalyst is Italian pumice.

3. Process according to claim 1, wherein said metal netting consists of an alloy of platinum and iridium.

4. Process according to claim 1, which comprises introducing a member selected from the group consisting of nitrogen oxide and ammonia into said gas mixture.

5. Process according to claim 1, which comprises supplying heat to at least one of the metal netting and the fixed porous catalyst bed.

6. Process according to claim 1, which comprises preheating at least one of the reactant gases prior to passing the same through said fixed porous catalyst bed.

7. Process according to claim 1, which comprises recovering the heat evolved for subsequent use.

8. Process according to claim 1, wherein the formaldehyde is separated from the reaction product gas stream which is thereafter re-cycled into the reaction.

9. Process according to claim 1, wherein said hydrocarbon is a member selected from the group consisting of methane, ethane and propane.

10. The process claimed in claim 1 carried out continuously.

References Cited by the Examiner

UNITED STATES PATENTS

| | | | |
|---|---|---|---|
| 2,186,688 | 1/1940 | Walker | 260—604 |
| 2,590,124 | 3/1952 | Reeder | 260—604 |
| 2,685,547 | 8/1954 | Holzmann et al. | 252—477 |
| 2,657,121 | 10/1957 | Rollins | 23—288 |
| 2,941,007 | 6/1960 | Callahan et al. | 260—604 |
| 2,974,173 | 3/1961 | Long et al. | 260—604 |
| 2,975,144 | 3/1961 | Gross et al. | 252—477 |
| 2,980,515 | 4/1961 | Horner et al. | 23—288 |

LEON ZITVER, *Primary Examiner.*

CHARLES B. PARKER, *Examiner.*